June 22, 1965  F. L. THARP  3,190,615
MANUALLY-OPERATED TRAILER-MOVING DEVICE
Filed Feb. 6, 1963
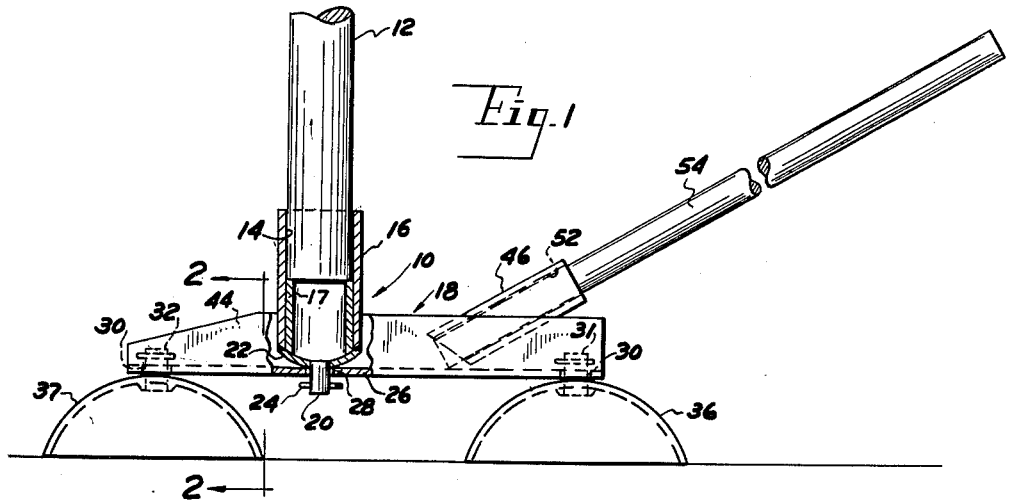
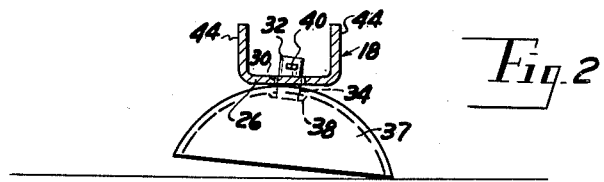
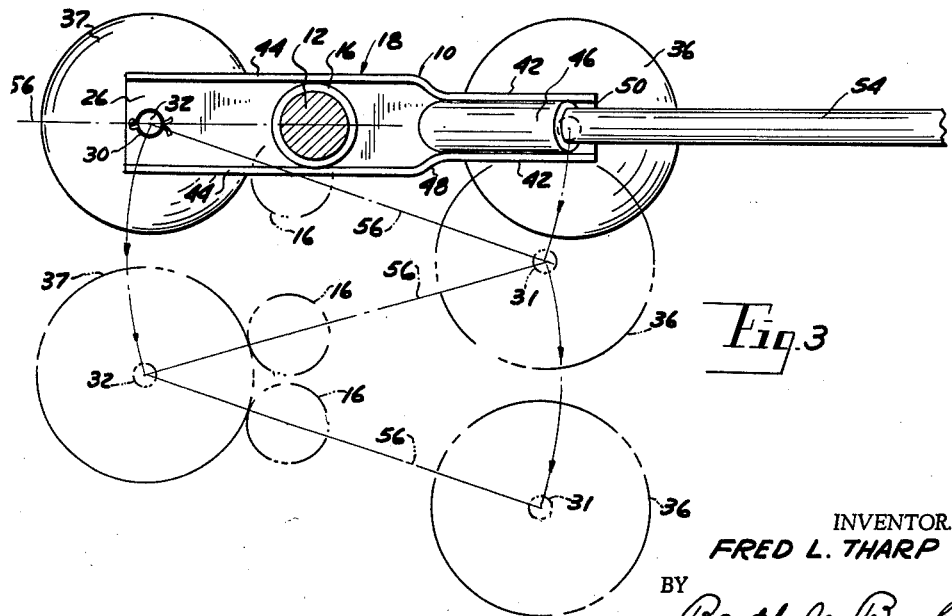
INVENTOR.
FRED L. THARP
BY
Barthel & Bugbee
ATTORNEYS

United States Patent Office 3,190,615
Patented June 22, 1965

3,190,615
MANUALLY-OPERATED TRAILER-MOVING DEVICE
Fred L. Tharp, 22944 Oakwood Ave., East Detroit, Mich.
Filed Feb. 6, 1963, Ser. No. 256,759
8 Claims. (Cl. 254—131)

This invention relates to trailer equipment and, in particular, to trailer moving devices.

One object of this invention is to provide a trailer moving device by means of which a trailer which has been uncoupled from the tractor or other towing vehicle can be moved manually to a different position upon the parking lot or shifted short distances to better adapt it to its location.

Another object is to provide a trailer moving device of the foregoing character which is inserted beneath the prop or hoist leg at the front of the trailer and operated by alternately lifting upward and pushing downward upon an elongated hand lever while simultaneously shifting the base portion of the device sidewise in alternate motions.

Another object is to provide a trailer moving device of the foregoing character wherein the base portion of the device to which the hand lever is connected is provided with a pair of feet or shoes which are alternately shifted sidewise by means of the hand lever with one foot serving as a fulcrum while the other foot is raised off the ground and shifted laterally, thereafter repeating the operation with the foot just shifted serving as a fulcrum for the lateral shifting of the foot which has just previously acted as the fulcrum, thus propelling the device sidewise by a "walking" motion of the feet.

Other objects and advantages of the invention will become apparent during the course of the following description of the accompanying drawings, wherein:

FIGURE 1 is a side elevation partly in central vertical section, of a trailer moving device, according to one form of the invention, with the device in its stationary position with both feet resting on the ground;

FIGURE 2 is a cross-section taken along the line 2—2 in FIGURE 1, but showing the forward end of the device and forward foot thereof raised slightly prior to shifting it laterally while pivoting on the rearward or right-hand foot; and FIGURE 3 is a top plan view of the trailer moving device shown in FIGURE 1, with the trailer prop or hoist leg in cross-section, showing the successive positions occupied by the feet and prop in shifting the latter sidewise.

Hitherto, after a trailer, such as a house trailer, has been uncoupled from the towing vehicle, such as a tractor or passenger automobile, it has been difficult to perform minor changes of location of the trailer in order to move it into its precise parking place or to shift it slightly from one position to another. The present invention provides a simple yet powerful device by which this task may be accomplished manually by the owner or user of the trailer, as set forth in the foregoing objects.

Referring to the drawing in detail, FIGURES 1 and 3 show a trailer moving device, generally designated 10, according to one form of the invention, which is adapted to move a trailer, such as a house trailer (not shown) having a downwardly-extending prop, leg or "hoist" 12 at the front of the trailer. The trailer moving device 10 is provided with a bore or socket 14 contained in the upper end of a rocking tubular prop socket member or prop receiver 16 containing a liner or stop sleeve 17 upon which the prop 12 rests. The tubular member 16 has its lower portion secured within a combined frame and guide channel 18 by means of a projecting boss or pin 20 welded or otherwise secured to the partially spherical lower end closure or wall 22 welded to the lower end of the tubular socket member 16. The projection 20 is drilled near its lower end to receive a cotter pin 24 disposed below the bottom wall 26 of the channel 18, which is provided with an enlarged hole 28 which is of sufficiently larger diameter than the projection 20 in order to permit relative rocking therebetween. In other words, the projection 20 has a "sloppy fit" within the hole 28 in order to permit the channel frame or base member 18 to be lifted alternately first at one end and then at the other end so as to "walk" the device 10 around, as explained more fully below.

The bottom wall 26 of the channel frame member or base member 18 is provided at its opposite ends with enlarged holes 30 through which project upstanding rearward and forward pins 31 and 32 respectively, the lower ends of which pass through holes 34 (FIGURE 2) in bell-shaped or cup-shaped rearward and forward feet or supports 36 and 37 respectively and are welded as at 38 inside the feet or supports 36 and 37. The upper ends of the pins 31 and 32 which lie above the bottom wall 26 of the channel member 18 are drilled to receive cotter pins 40. The looseness of fit or "sloppy fit" of the pins 31 and 32 in their holes 30 is such as to permit the feet 36 and 37 to rock or tilt loosely as the device is operated in the manner set forth below.

Welded or otherwise secured within the channel base member or frame member 18 between the narrowed portions 42 of the opposite side walls 44 thereof (FIGURE 2) is an inclined handle lever socket member 46, the channel side walls 44 being bent toward one another as at 48 to provide the narrowed trough 50 into which the handle socket member 46 fits. The handle socket member 46 contains a bore 52 in which is removably inserted the lower end of an elongated inclined bar constituting an inclined handle lever 54 which serves to shift the device 10 laterally and consequently to cause its central axis or center line 56 to move sidewise during operation, as described below. The axis of the inclined handle lever 54 preferably is disposed in approximately the same vertical plane as the pins 31 and 32 of the feet 36 and 37.

In the operation of the invention, let it be assumed that the trailer moving device 10 has been placed under the prop 12 of the trailer to be moved with its socket member 16 in alignment therewith. By means of its conventional screw mechanism (not shown), the prop 12 is then lowered into the bore 14 onto the upper end of the liner or stop sleeve 17. The trailer is then uncoupled from the towing vehicle and the device 10 is ready for use.

To shift the prop 12 and consequently the forward end of the trailer laterally, the operator lifts or pulls upward on the upper end of the handle lever 54, thereby placing all of the weight of the trailer upon the forward foot 37 thereof, which rests upon the ground, while lifting the rearward foot 36. While the rearward foot 36 is in its raised position, the operator swings the handle lever 54 sidewise (FIGURE 3), pivoting around the forward foot 37 and causing the rearward foot 36 to assume a new position shown in the first dotted line position at the right-hand side of FIGURE 3, whereupon he lowers the rearward foot 36 into contact with the ground in its thus shifted position. He then presses downward upon the outer end of the handle lever 54, thereby shifting the trailer load onto the rearward foot 36 which rests upon the ground while he raises the forward foot 37 and, while so raised, shifts it laterally into the dotted line position shown at the left-hand side of FIGURE 3. This action is repeated alternately so as to cause the prop socket member 16 to assume the successive dotted line positions shown in FIGURE 3, by alternately raising and lowering the handle lever 54 and swinging it laterally, as described above.

If it is desired to move the trailer longitudinally, the operator places the longitudinal or central axis 56 of the trailer moving device 10 perpendicular to the longitudinal axis of the trailer, that is, crosswise or transversely of the trailer axis, and repeats the foregoing operations. By thus "walking" the trailer moving device 10 on the ground or parking lot, the trailer may be moved in any direction. This operation of the trailer moving device 10 may be described as a "walking" operation because of the alternate raising, lowering and lateral swinging of the rearward and forward feet 36 and 37 respectively which takes place during such operation.

What I claim is:

1. A manually-operated trailer-moving device for an uncoupled trailer having at its forward end a depending prop, said device comprising
    a base structure,
    forward and rearward ground-engaging feet connected to said base structure in longitudinally spaced relationship thereon, said feet extending downwardly from said base structure and constantly maintaining the bottom of said base structure at a level above the bottom of said feet during trailer moving operation of said device,
    a trailer prop receiver mounted on said base structure intermediate said feet and adapted to hold the prop,
    and an elongated handle lever secured to said base structure in substantially rigid relationship therewith and extending upwardly and rearwardly therefrom, whereby vertical swinging of said handle lever substantially correspondingly tilts said base structure and alternately lifts said feet of the ground.

2. A manually-operated trailer-moving device for an uncoupled trailer having at its forward end a depending prop, said device comprising
    a base structure,
    forward and rearward ground-engaging feet connected to said base structure in longitudinally-spaced relationship thereon, said feet extending downward from said base structure and constantly maintaining the bottom of said base structure at a level above the bottom of said feet during the trailer-moving operation of said device,
    a trailer prop receiver mounted on said base structure intermediate said feet and adapter to hold the prop,
    and an elongated handle lever secured to said base structure and extending upwardly and rearwardly therefrom, said feet being rockably connected to said base structure.

3. A manually-operated trailer-moving device for an uncoupled trailer having at its forward end a depending prop, said device comprising
    a base structure,
    forward and rearward ground-engaging feet connected to said base structure in longitudinally-spaced relationship thereon, said feet extending downward from said base structure and constantly maintaining the bottom of said base structure at a level above the bottom of said feet during the trailer-moving operation of said device,
    a trailer prop receiver mounted on said base structure intermediate said feet and adapter to hold the prop,
    and an elongated handle lever secured to said base structure and extending upwardly and rearwardly therefrom,
    said prop receiver being rockably mounted on said base structure.

4. A manually-operated trailer-moving device, according to claim 1, wherein said prop receiver is connected to said base structure intermediate the connections of said feet thereto.

5. A manually-operable trailer-moving device, according to claim 1, wherein the axis of said handle lever is disposed in approximately the same vertical plane as the connections of said feet to said base structure.

6. A manually-operable trailer-moving device, according to claim 2, wherein the connections of said feet to said base structure comprise fasteners extending upwardly from said feet into said base structure.

7. A manually-operable trailer moving device for an upcoupled trailer having at its forward end a depending prop, said device comprising
    a base structure,
    forward and rearward ground-engaging feet connected to said base structure in longitudinally-spaced relationship thereon, said feet extending downward from said base structure and constantly maintaining the bottom of said base structure at a level above the bottom of said feet during the trailer-moving operation of said device,
    a trailer prop receiver mounted on said base structure intermediate said feet and adapter to hold the prop,
    and an elongated handle lever secured to said base structure and extending upwardly and rearwardly therefrom,
    said base structure including a channel member with upturned side flanges,
    an inclined handle lever socket member being rigidly secured to said base structure between said flanges, and the lower end portion of said handle lever being removably received in said socket member.

8. A manually-operated trailer-moving device for an uncoupled trailer having at its forward end a depending prop, said device comprising
    a base structure,
    forward and rearward ground-engaging supports connected to said base structure in spaced relationship thereon and extending downwardly therefrom,
    a trailer prop receiver mounted on said base structure intermediate said supports and adapted to hold the prop,
    and an elongated handle lever secured to said base structure and extending upwardly and rearwardly therefrom,
        said prop receiver being rockably mounted on said base structure and having a lower end portion of approximately arcuate cross-section rockably engaging said base structure.

References Cited by the Examiner
UNITED STATES PATENTS
2,669,423   2/54   Pehrsson.
2,754,108   7/56   Brown.

WILLIAM FELDMAN, *Primary Examiner.*
MILTON S. MEHR, *Examiner.*